Aug. 26, 1947.  R. C. HOPGOOD, JR  2,426,218
INSTRUMENT NAVIGATION SYSTEM
Filed March 23, 1942  3 Sheets-Sheet 1
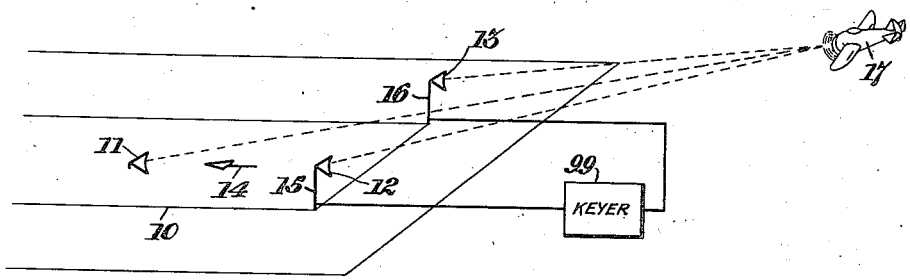
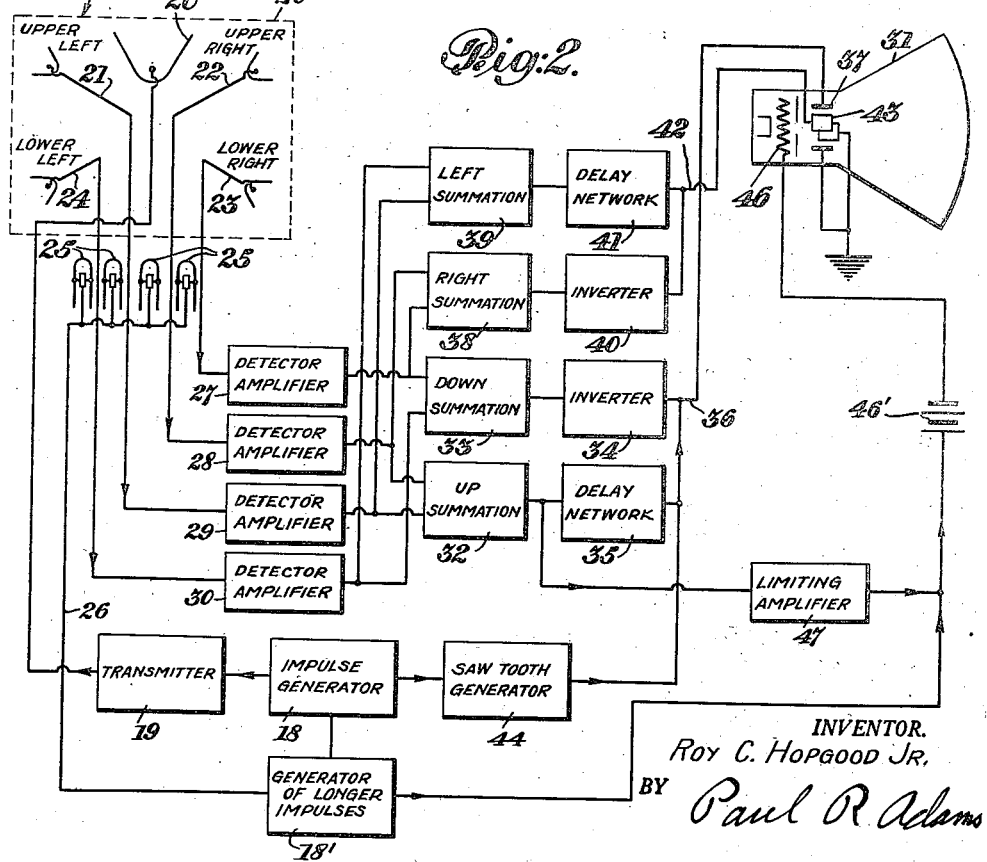
INVENTOR.
Roy C. Hopgood Jr,
BY Paul R Adams
ATTORNEY

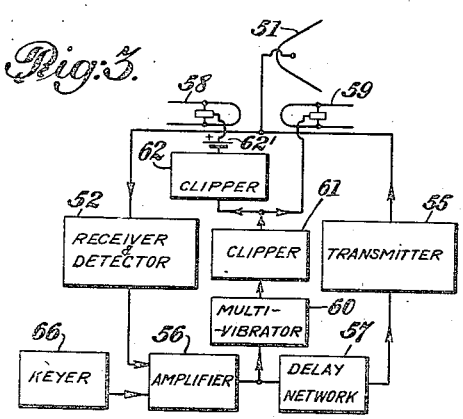

Fig. 3.

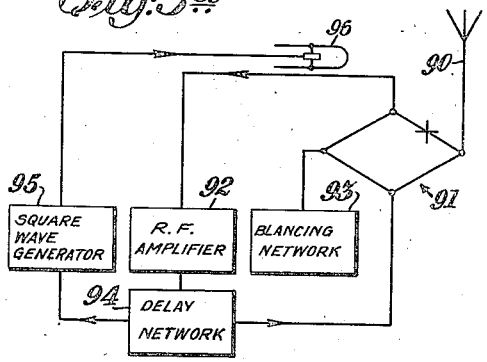

Fig. 3a.

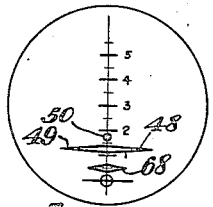

IN GLIDE PLANE
ON COURSE

Fig. 5.

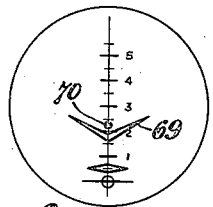

BELOW GLIDE PLANE
ON COURSE

Fig. 6.

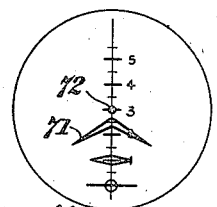

ABOVE GLIDE PLANE
ON COURSE

Fig. 7.

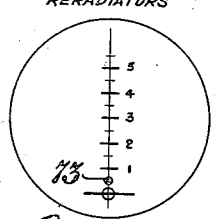

PAST OUTER
RERADIATORS

Fig. 8.

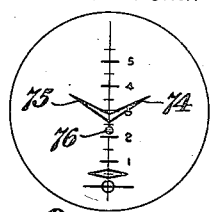

APPROACHING FROM
WRONG DIRECTION

Fig. 9.

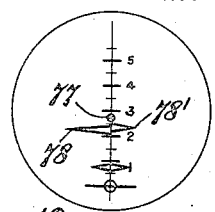

IN GLIDE PLANE
LEFT OF COURSE

Fig. 10.

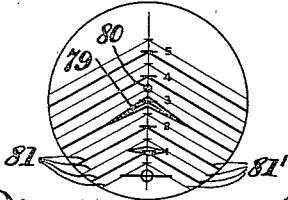

IN GLIDE PLANE
ON COURSE
(ALL RERADIATORS ON GROUND)

Fig. 11.

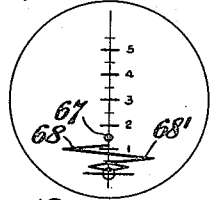

IN GLIDE PLANE
ON COURSE
(MODIFIED RERADIATORS)

Fig. 12.

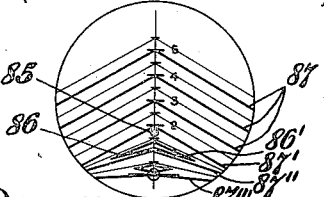

IN GLIDE PLANE; ON COURSE
ALL RERADIATORS ON GROUND
(TO LAND AT NEAR EDGE OF FIELD)

Fig. 13.

INVENTOR.
ROY C. HOPGOOD JR.
BY Paul R. Adams
ATTORNEY

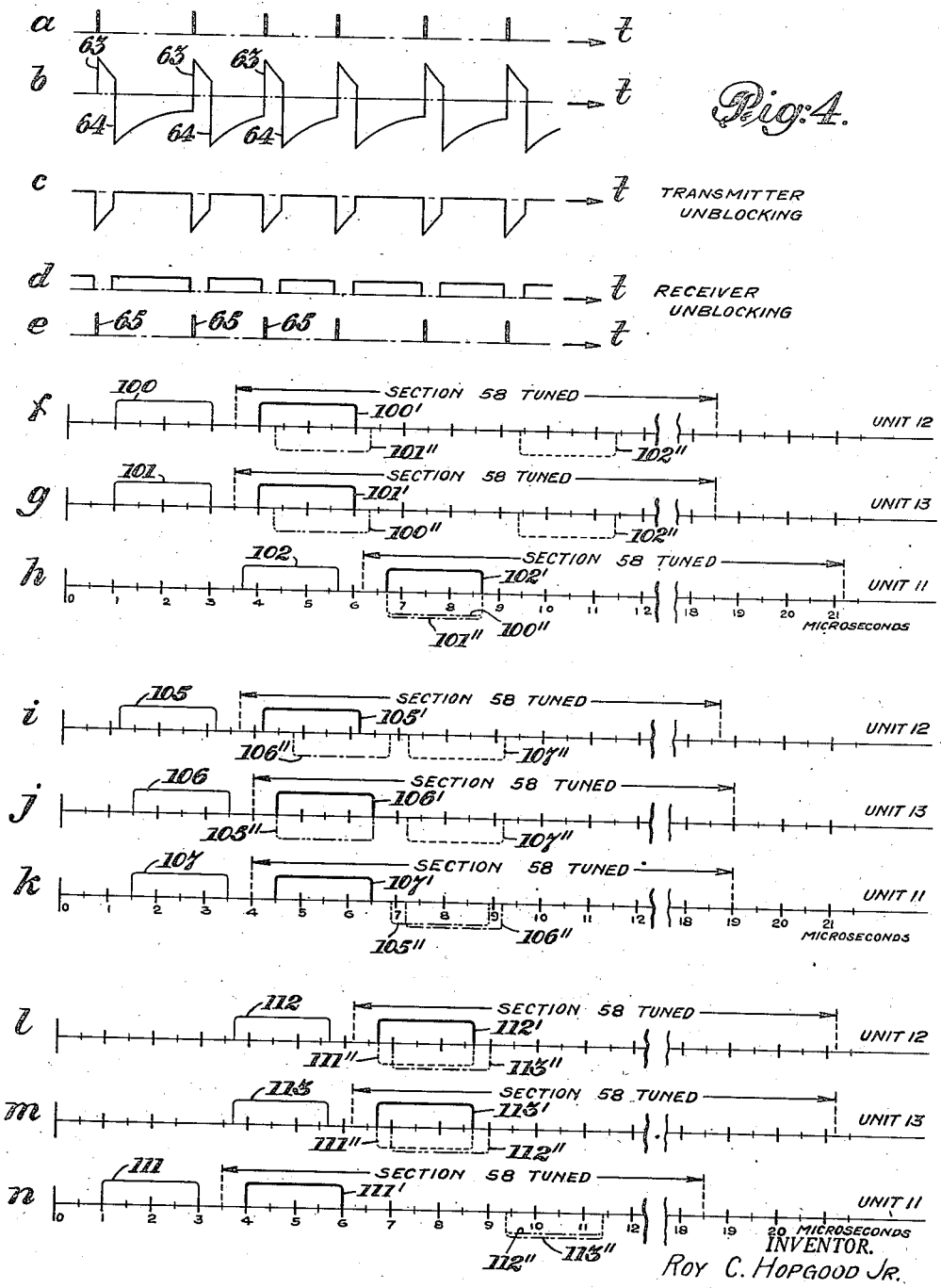

Patented Aug. 26, 1947

2,426,218

UNITED STATES PATENT OFFICE 2,426,218

INSTRUMENT NAVIGATION SYSTEM

Roy C. Hopgood, Jr., Glen Ridge, N. J., assignor to International Standard Electric Corporation, New York, N. Y., a corporation of Delaware Application March 23, 1942, Serial No. 435,873

13 Claims. (Cl. 250—1)

This invention relates to radiant energy systems for aiding in the navigation of mobile bodies, and particularly to such systems as aid in the landing and other navigation of aircraft.

It is a broad object of the invention to provide an improved navigation system.

It is also an object to provide an improved instrument landing system.

Another object is to provide an improved instrument landing system employing the transmission of brief trains of ultra-high-frequency waves whereby highly efficient functioning is obtained.

A further object is to provide a secret instrument landing system in which there is normally no radiation of energy from the vicinity of the desired landing area, whereby the landing area will not be detectable by ordinary direction finder equipment and hence may not be readily located by enemy aircraft.

Still another object is to provide an improved instrument landing system wherein apparatus to be installed in the vicinity of the desired landing area may be extremely simple and readily portable.

It is also an object to provide an improved instrument navigation system wherein existing obstacle-detection and/or absolute altitude apparatus on the aircraft may be employed without requiring additional equipment on the aircraft.

A still further objective is to provide an improved instrument landing system which is relatively unaffected by changing weather conditions.

Other objects and various further features of novelty and invention will hereinafter be pointed out or will become apparent to those skilled in the art from a reading of the following specification in conjunction with the drawings included herewith.

In said drawings—

Fig. 1 is a schematic showing in perspective of a landing field provided with a set of guiding equipment according to the invention;

Fig. 2 is a schematic circuit diagram of one known type of obstacle-detection apparatus which is suitable for employment on an aircraft for cooperating with the landing field guiding equipment of Fig. 1 in accordance with the invention;

Figs. 3 and 3a are schematic circuit diagrams of alternate forms of guiding apparatus to be installed in the vicinity of a desired landing area in accordance with the invention;

Curves a, b, c, d, . . . n of Fig. 4 graphically illustrate wave-forms within the circuit of Fig. 3; and Figs. 5 through 13 represent possible indications obtained with the apparatus of Fig. 2 under various conditions of flight in the neighborhood of a landing area equipped in accordance with the invention.

Broadly speaking, the invention contemplates the employment for the purpose of instrument landing of obstacle detector and locator apparatus normally carried on aircraft for other purposes. Many such detector systems have been devised such as those described, for example, in the co-pending applications for patent of Messrs. Labin and Busignies, Serial No. 383,108 filed March 13, 1941; Serial No. 382,391 filed March 8, 1941; and Serial No. 417,151 filed October 30, 1941. In accordance with these systems a transmitter on the aircraft intermittently radiates brief trains of ultra-high-frequency waves generally forward of the aircraft, and directionally responsive antenna means are provided on the aircraft for picking up directional components of received reflections of the wave trains so transmitted. The reflected energy components thus received are thereafter detected and appropriately combined in groups and supplied to the control system of a cathode ray oscillograph device whereby a simultaneous indication of the direction of and distance to the reflecting object is graphically depicted on the screen of the oscillograph.

In accordance with the invention, I propose to set up a plurality of reradiating or reflecting members about a desired landing area. When a pilot flying an aircraft equipped with the above-mentioned apparatus arrives in the vicinity of the airport, he may detect a plurality of indications in his oscillograph screen corresponding to this plurality of reradiators or reflectors about the landing area. Knowing what kind of configuration of such indications to expect for a proper glide path, the pilot may maneuver his craft safely above all ground obstacles until such a configuration is obtained. Thereafter all the pilot has to do is to maintain substantially the same configuration in a normal glide and he will conduct himself safely to the desired landing area.

The broad operation of a preferred set-up in accordance with the invention will be better understood by reference to Fig. 1. This schematic showing depicts in perspective the vicinity of a desired landing area 10 about which are disposed a plurality of reflecting units 11, 12, 13. In order to avoid any possibility of collision with reflectors 11, 12 and 13, these units are preferably disposed outside of the desired landing area or under the ground level. In the form shown, reflector 11 is arranged along the axis of the desired landing direction 14 and generally centrally of landing area 10. In order to avoid any possibility of collision with reflector 11, it is located under the ground in a pit covered with non-shielding material, such as planking in a well-known manner. Reflectors 12 and 13 are preferably spaced equally from the desired landing axis and ahead of the desired landing position, as shown. Reflectors 12 and 13 are also supported in raised position with respect to reflector 11 by means of appropriate poles or towers 15 and 16. The elevation of reflectors 12 and 13 with respect to reflector 11 is such that the three reflectors 11, 12 and 13 uniquely determine a plane making an angle with the plane of landing area 10 so as to determine an appropriate glide angle.

With the system thus far described it will be clear that all the pilot of an aircraft 17 equipped with obstacle-detection apparatus of the above-indicated nature has to do to come down at the correct gliding angle is so to manoeuvre his plane that his obstacle-detection indicator discloses three objects directly ahead, all of them being in the same plane and symmetrically disposed therein.

A still better understanding of operation of the apparatus in accordance with the invention may be obtained from the following disclosure of specific circuits which may be employed as the obstacle-detection apparatus carried by the aircraft and as reflectors 11, 12 and 13.

Fig. 2 schematically shows an obstacle-detection circuit suitable for installation on aircraft. This circuit is generally of the nature disclosed in the above-mentioned co-pending application of E. Labin. In accordance with this circuit, an impulse generator 18 supplies a series (which may be intermittent or continuous and periodically recurrent) of extremely sharp impulses to a transmitter 19. Transmitter 19 then supplies brief wave trains corresponding to these impulses to a generally forward directional element 20 of the antenna system 20' for radiation in a direction generally forward of the aircraft. Antenna system 20' further includes four directionally discriminating antenna elements 21, 22, 23 and 24, all of which are generally directional in a forward sense but each of which is predominantly sensitive in one of four quadrants. Thus, antenna element 21 is predominantly sensitive upward and to the left of the aircraft in a forward direction, antenna element 22 is predominantly sensitive above and to the right of the aircraft in a forward direction, antenna element 23 is predominantly sensitive below and to the right of the aircraft and in a forward direction, and antenna element 24 is predominantly sensitive below and to the left of the aircraft and generally forward thereof.

Receiving antennae 21, 22, 23, 24 are each connected to one of detector amplifier means 27, 28, 29, 30, as shown. In order to prevent these receiving antennae from sending large signals to the receiving circuits of networks 27 through 30 for each wave train transmitted from antenna 20, I preferably provide antenna blocking means 25 associated with each of the transmission lines connected to antennae 21 through 24. Antenna blocking means 25 is preferably of the nature disclosed in the co-pending application of R. B. Hoffman, Serial No. 418,671, filed November 12, 1941, and serves effectively to block these transmission lines at least during the instant in which a wave train is being transmitted. As disclosed in the said Hoffman application, circuits 25 are quarter-wave-length transmission lines, shorted at one end, and tuned or detuned in accordance with a control signal. Such circuits will hereinafter be referred to as coupled sections. When tuned and disposed closely adjacent the transmission line, a coupled section will effectively block transmission along the line, and when detuned, energy may pass along the line.

As indicated, control impulses for operating coupled sections 25 are preferably of a duration greater than that of the transmitted wave trains so as more positively to exclude any direct reception of the transmitted energy. Accordingly, a generator 18' of longer impulses than those supplied by generator 18 is shown synchronized therewith and coupled to the control elements of coupled sections 25. In a preferred embodiment, impulse generator 18 is of the nature disclosed in the co-pending application of E. Labin, Serial No. 406,499, filed August 12, 1941, wherein impulses are generated by the intermittent charging and discharging of an inductance. In such a generator, considerable current must be passed through the inductance for an interval prior to the discharge impulse, and, accordingly, a voltage proportional to this charge current is used to generate the longer impulses for controlling coupled sections 25. Since this charge current necessarily commences several microseconds prior to the discharge (which is of the order of two microseconds duration), ample time is afforded the control circuits for coupled sections 25 properly to resonate these sections so as assuredly to block the transmission lines associated therewith by the time a wave-train is transmitted at the instigation of a discharge of the inductance of impulse generator 18.

Since a steady control potential is required to keep coupled sections 25 tuned to resonance, generator 18' includes limiting means for this purpose. It is clear that by the time the inductance of generator 18 is discharged, the blocking impulse supplied by generator 18' is extinguished and coupled sections 25 are returned to their normal detuned state so as to permit passage of energy along the lines with which they are associated. In this manner, almost immediately following the transmission of a wave train, the receiving antenna circuits and receivers 27 through 30 are conditioned for reception whereby uni-directional impulses indicative of the relative strength of reflections picked up by the respective receiving antenna elements may be obtained in the respective outputs of detector amplifiers 27 through 30. Thus, the magnitude of uni-directional impulses obtained in the output of detector amplifier 27 will be indicative of the magnitude of reflection of energy in the lower right quadrant ahead of the aircraft, the magnitude of uni-directional impulses obtained in the output of detector amplifier 28 will be indicative of the magnitude of received reflections in the upper right quadrant and ahead of the aircraft (and similarly for the magnitudes of uni-directional impulses obtained in the outputs of detector amplifiers 29 and 30).

In accordance with the teachings of the above-mentioned Labin application Serial No. 383,108, each of the respective outputs of detector-amplifier circuits 27 through 30 is employed for simultaneous application of directionally indicative deflection potentials to the deflection systems of a cathode ray indicating device 31. In the form shown, these deflecting potentials are obtained as follows: The outputs of detector-amplifiers 28 and 29, representing the greater part of the energy received in a generally upward sense, are both applied to a so-called "up" summation network 32, whereby a single indication of energy received in an upward sense is obtained. In the same manner the outputs of detector-amplifiers 27 and 30, representative of energy received in a generally downward direction from antenna elements 23, and 24, may be applied to a so-called "down" summation network 33. In order then to obtain an indication of the relative "upness" or "downness" of a reflected signal, the outputs of networks 32 and 33 may be compared to each other, as by providing an inverter circuit 34 to permit effective subtraction. In the circuit shown inverter network 34 is in series with the "down" summation network 33, and these two circuits combined may involve a greater delay in transmitting an impulse than does passage through the "up" summation network 32. In order, therefore, to permit an accurate superposition of inverted "down" summation pulses with respect to "up" summation pulses, appropriate delay means 35 is included in the circuit of the "up" summation network, thus assuring accurate timing. Pulses present in line 36 are thus clearly indicative of the relative "upness" or "downness" of the received reflected impulse energy and may be directly applied to the vertical deflection system 37 of cathode ray tube 31.

In an analogous manner, the outputs of detector amplifiers 27 through 30 are also employed to apply deflecting potentials indicative of the relative "rightness" or "leftness" of received reflections of impulse energy to the horizontal deflection system 43 of cathode ray tube 31. To this end, the respective outputs of detector-amplifiers 27 and 28, representing energy received by antenna elements 22 and 23 (in a direction generally to the right) are supplied to a "right" summation network 38, whereby pulses indicative of total energy received from the right are obtained. Similarly, outputs of detector amplifiers 29 and 30 are connected to a "left" summation network 39 in order to obtain pulses indicative of energy received in a leftward sense. As in the case of the "up" and "down" summation circuits 32 and 33, an inverter network 40 and appropriate delay means 41 are included in the respective circuits 38 and 39. The inverted and appropriately delayed outputs of networks 38 and 39 are then superimposed in line 42; and, when connected to the horizontal deflection system 43, cathode ray tube 31 may be supplied with potentials indicative of the relative "rightness" or "leftness" of the received signals. Preferably the summation circuits 32, 33, 38 and 39 and the delay and inverter circuits 35, 40 and 41 are so designed and adjusted that the total delay for any particular wave train received by the antenna system 20 is exactly the same when applied in deflection potential form to deflecting systems 37 and 43 of the cathode ray tube. In this manner, it will be clear that, for any particular wave train received, one single resultant deflection potential may be applied to the deflection systems of the cathode ray tube, whereby for this particular received wave train there will be a corresponding directionally indicative deflection of the cathode ray and hence of the image appearing on the screen of tube 31.

In order to obtain an indication of the distance to the reflecting object, the circuit of the above-mentioned Labin application provides a saw-tooth generator circuit 44 operating in synchronism with the generation of impulses, as shown schematically by a direct connection to generator 18. In such use of the word "synchronism" it is to be understood that a fresh saw-tooth wave is commenced for each impulse generated by network 18. The saw-tooth waves thus supplied by generator 44 are then applied directly to the vertical deflection system 37 of cathode ray tube 31. In accordance with well-known principles, the potentials thus supplied to the vertical deflection system serve to provide a vertical distance indicating axis on the screen of tube 31 so that, when directionally indicative deflection potentials are momentarily applied in the above-indicated manner to deflection systems 37 and 43, their delay with respect to the transmitted impulses to which they correspond (which corresponds to the distance to the reflecting object) will be represented by their vertical position on this axis.

In order to avoid confusion on the screen of tube 31, I prefer to suppress any traces which might be produced as a result of stray direct pick-up of emitted energy (or control energy involved in generating and transmitting such emitted energy). For this purpose, I block the ray of tube 31 by supplying blocking pulses with impulse generator 18. These pulses serve to block out or suppress emission of the cathode ray in tube 31 by applying for the blocking interval (which is preferably the interval for which coupled sections 25 are tuned) a sufficiently negative bias to a grid electrode 46 included in tube 31. It will be clear that such a connection serves to prevent a visible recording on the screen of tube 31 indicative of transmitted wave trains.

Reduction of further undesirable visible indications on the screen of tube 31 is accomplished by providing a normal negative bias, such as the battery 46', on grid 46 of sufficient magnitude normally to suppress emission of the cathode ray. In addition, a further network 47 is provided for permitting a reduction of the degree of bias on grid 46 to a point above cut-off (whereby the cathode ray is produced) for the interval while impulse energy representative of received reflections of wave trains is being applied to the deflection systems 37 and 43. Such a network comprises amplifier 47 having its input coupled between network 32 and 35 and connected to apply deblocking impulses to grid 46. Amplifier 47 is preferably of the limiting type so that the same strength cathode ray may be produced for all detected wave train reflections, as will be clear. Limiting amplifier 47 is connected ahead of delay network 35, first because the delay produced thereby is relatively slight, and also to permit the cathode ray to attain normal strength by the time deflection potentials are applied to divert the same.

With the system thus far described, it is apparent that for each received reflected wavetrain a single indication may be obtained on the screen of tube 31, and this indication may simultaneously indicate the distance and general direction of a reflecting object. Thus, in Fig. 5, which represents the screen of a cathode ray tube having a vertical distance scale, indication 48 may mean a reflecting object to the right of the aircraft carrying the apparatus. This indication will further mean that this reflecting object is about, say, one and a quarter distance units away and in the so-called "horizontal" plane of the detecting antenna equipment, (which may for the present be assumed to be in the plane of the wings of the aircraft). On the other hand, indication 49 may be indicative of another reflecting object to the left of the aircraft the same distance away and in this horizontal plane. The spot 50 appearing on the screen may indicate a still further reflecting object directly ahead and just short of two distance units away. The reason indication 50 is a spot will be appreciated from the fact that, if an object is directly ahead, reflections therefrom as detected by antenna units 21, 22, 23 and 24, respectively, will be of the same signal level, and, accordingly, deflection potentials applied to deflection systems 37 and 43 will be zero along either the vertical or horizontal axis.

With respect to indications 48, 49 and 50 obtained on the cathode ray screen shown in Fig. 5, it is to be noted that all of the objects from which reflections are detected are at least in the above-mentioned horizontal plane. The fact that indications 48 and 49 are substantially equal and equally spaced indicates a symmetrical disposition (of the objects indicated thereby) with respect to the axis of flight of the aircraft. Thus, the indications of Fig. 5 depict three reflecting bodies symmetrically disposed with respect to the aircraft and in the plane of its flight.

These indications 48, 49, 50 convey information to the pilot that he is in the plane defined by the three reflecting antenna unts 11, 12 and 13 above discussed, and that the axis of his antenna system 20' is directed at the far reflector 11. Once having obtained this set of indications, all the pilot has to do is to maintain the same configuration until the right and left horizontal indications 48 and 49 disappear off the screen of the cathode ray tube. When this occurs the pilot will be warned of the fact that he has just crossed a point near the approaching edge of the landing area and he may then probably see the ground and effect a safe landing. If by chance it is too foggy to see the ground once indications 48 and 49 have disappeared from the screen of the indicator tube, the pilot will at least be reassured that he is low and over the edge of the desired landing area, and that all that need be done to effect a reasonably safe landing is to cut his motor and stall in the customary manner.

Although passive reflector antenna networks may operate as either of reflectors 11, 12 or 13 to give suitable landing indications in the above manner it is considered preferable to obviate any chance of false or misleading landing indications being set up by trees, hangers, telephone wires and other reflecting objects by employing a relay circuit in connection with each of the reradiators 11, 12 and 13.

A preferred form of such a reradiator is shown in Fig. 3. In this circuit, a single antenna 51 having preferably directional characteristics is employed both for reception and transmission and is thus directly connected both to a detecting receiver 52 and a transmitter 55. Coupled sections 58, 59 are alternatively operative in a manner which will hereinafter be pointed out to make a single freely conducting path between antenna 51 and receiver 52 alternately with a single freely conductive path between antenna 51 and transmitter 55. Network 52 supplies for each received wave train a uni-directional impulse corresponding to the wave train envelope and passes the same on for amplification in amplifier 56. The impulse is then delayed a certain amount in an appropriate network 57 whence it is relayed to transmitter 55 to modulate a fresh wave train preferably of the same carrier frequency as that generated by transmitter 19.

The control circuit alternately operating coupled sections 58 and 59 is operative normally to resonate coupled section 59 and to detune coupled section 58 whereby a normal single conductive path is established between antenna 51 and receiver 52. Upon detection of a wave train, a control impulse is supplied to tune coupled section 58 (thus blocking the input line to receiver 52) and at the same time to detune coupled section 59 (and hence effectively open the output line from transmitter 55). The delay instituted by network 57 is of a sufficient magnitude to permit the above-mentioned tuning and detuning alternation of coupled sections 58 and 59 to take place before a wave train corresponding to the received wave train is supplied from transmitter 55. The control circuit for coupled sections 58, 59 is also effective to maintain this alternate tuned and detuned state for a sufficient period of time to permit transmission of the complete fresh wave train. Shortly thereafter this control circuit returns coupled sections 58 and 59 to their normal respective detuned and tuned states awaiting reception of a new wave train for a repetition of the cycle of operation, as will be clear.

In the form shown, the control circuit for coupled sections 58 and 59 comprises a multi-vibrator 60 controlled by output of amplifier 56, a clipper 61, and means supplying output energy from clipper 61 in two lines, one in opposite phase relation to the other, as by means of an inverter-clipper network 62 included in one of the lines. Operation of this control circuit will be better understood by reference to the graphical representations of Fig. 4, wherein the series of curves $a, b, c, d, e$, represents progressive voltage conditions in this control circuit, all said voltage conditions being plotted as a function of the same time scale. Curve $a$ of Fig. 4 represents the amplified detected envelopes of the successive received wave trains as present in the output of amplifier 56 and as supplied to control multi-vibrator 60. Multi-vibrator 60 is preferably of the single stability type wherein a complete cycle of alternate operations is controlled by a single impulsing or triggering condition. Output of multi-vibrator 60 is thus of the form shown in curve $b$, wherein it will be observed that one alternate operation thereof is always instigated (note leading edges 63) by the control impulses, and the other alternate operation always occurs a relatively small interval of time thereafter (note walls 64) as determined by a fixed charge leaking off a condenser through an appropriate resistance to a point where conductivity of the tube of the multi-vibrator 60 is cut off. The time-constant determining the remaining portion of the multi-vibrator cycle is relatively great compared with that defining the above-mentioned first portion (from edge 63 to wall 64) and is preferably large enough so that application of a succeeding control impulse is necessary to repeat the cycle of operation.

As indicated above in the discussion of coupled sections 25, a steady control potential is necessary to maintain a coupled section in its tuned state. Accordingly, clipper 61 is provided to clip out undesired portions of the output signals from multi-vibrator 60. Curve c represents such a clipped signal; and, inasmuch as the steady portions of this curve represent the longer intervals of time during which connection between transmitter 55 and antenna 51 is to be blocked, this signal may be applied directly to control the tuned or detuned state of coupled section 59. Since coupled section 59 is tuned for all intervals in which coupled section 59 is detuned, output from clipper 61 need only be clipped and displaced with respect to the zero axis (as by a single discharge tube in network 62 and a battery 62') to supply suitable control impulses for coupled section 59 (see curve d). It is to be noted in connection with the control potential supplied to coupled sections 58 and 59 that the potential of these signals, when controlling either coupled section for resonance, is always zero. In this manner, it may be assured that coupled sections 58 and 59 will resonate at the instants at which they are intended to and that such resonance will be relatively independent of varying voltage conditions throughout the control-potential generating circuits.

As a further illustration of preferred timing circuits in the arrangement of Fig. 3, delay network 57 is operative to effect such a delay in the impulses yielded from amplifier 56 (see curve a) that fresh wave trains will be transmitted while coupled section 59 is detuned and coupled section 58 is in a tuned condition. Curve e graphically illustrates the requisite delay, and it will be noted that all of the delayed impulses 65 are supplied during these intervals.

In certain cases, it is preferable to modify the reradiator of Fig. 3 to include one antenna for transmission and another for reception. The receiving antenna is then non-directional in character so that no matter what the direction of approach of homing aircraft, wave trains transmitted therefrom are received with substantially uniform magnitude for any particular distance from the reradiator unit. Thus the desired landing path signals as reradiated from the transmitting antennae of units 11, 12 and 13 are at a relatively uniform and high level regardless of the direction of approach of an aircrat to the landing area. It is to be noted that in these two-antenna reradiator arrangements, received energy is passed directly to the receiver, there being no conductive path to the transmitter from the receiving antenna and accordingly no need for a coupled-section blocking arrangement in the transmitter output line. However, in order to prevent wave trains transmitted by the reradiator from being directly received and reamplified, a coupled section or other blocking means should be included in the receiver input lines, as will be clear. Furthermore, if desired coupled section 59 may be omitted from the circuit of Fig. 3—provided the transmitter circuit 55 does not absorb too much received energy.

If it is desired that the above-described reradiator system (which is normally silent) be used to aid in homing aircraft in addition to establishing a secret glide path in the above-described manner, the antenna 51 of one of reradiator units 11, 12 or 13 (preferably unit 11) is non-directional in character whereby the pilot of the homing aircraft will be able clearly to know the location of the landing area no matter from what direction he approaches. If there happen to be a number of landing fields in one vicinity, all of which fields have glide-path-defining apparatus of the above-described nature, homing aircraft will be confronted with a plurality of confusing signals unless something is done to identify each landing area with respect to the others. In such case, the homing reradiator unit of each field should be so conditioned as positively to identify the field. To this end, a keying unit 66 may be provided to render this reradiator unit alternately effective and ineffective to reradiate wave trains in accordance with a keying pattern, say, a given Morse-code signal, at a slow enough rate so that the indicating apparatus on the aircraft will show the same by an on-and-off flash of the indication corresponding to that particular reradiator unit. Keyer 66 is connected in the form shown in Fig. 3 to amplifier 56 to control the bias of an amplifier tube therein, whereby amplifier 56 is rendered alternately effective and ineffective in accordance with the keying signal, as will be clear.

In order to demonstrate that the circuit such as that shown in Fig. 3 for each of the reradiator units will be responsive to the exclusion of wave trains reradiated by others of these reradiator units, three typical conditions will be examined. In Fig. 4, curves f, g, and h are representative of concurrent phenomena in the respective reradiators 12, 13 and 11 when the aircraft is on course; curves i, j and k represent corresponding phenomena in reradiators 12, 13 and 11 when the aircraft is so far to the left of the course as to be normal to line joining reradiators 11 and 13 and equidistant from these latter two reradiators (in other words, substantially normal to the proper course); and curves l, m and n represent these phenomena when the aircraft is 180° off course. In the following comparative instances, reradiators 12 and 13 are one hundred yards apart and spaced substantially a half mile from the far reradiator 11; the envelope of transmitted wave trains has an effective width of substantially two microseconds; delay throughout the receiver, amplifier, multi-vibrator, and clipper stages is two and a half microseconds; delay through receiver, amplifier, delay and transmitter stages is three microseconds, and the time constant of the circuit controlling the first alternate operation of multi-vibrator 60 is adjusted to produce a time interval between walls 63 and 64 equal substantially to 15 microseconds. In the showings of curves f through n both the transmitted wave trains and detected envelopes have been shown as square waves of the same magnitude merely for purposes of clarity—the purpose of the curves being solely to demonstrate the relative timing of the respective reradiator units 11, 12, 13.

Under the "on course" conditions, reradiators 12 and 13 will be the first to receive a given wave train. This fact is indicated on curves f, and g, by the concurrent square waves 100 and 101. Due to the fact that reradiator 11 is a half mile distant, the same wave train is received there approximately 2.7 microseconds later and is thus indicated as square wave 102 on curve h. Approximately a half microsecond after termination of the received wave trains, the coupled section 58 associated with each of the reradiators is operated to a tuned state whereby receiver 52 is effectively blocked. Substantially, a half microsecond after such tuning, each of the reradiator units transmits a fresh wave train as indicated by square waves 100', 101', 102'. Both of the wave trains transmitted from units 12 and 13 will simultaneously reach reradiator unit 11 about 2.7 microseconds after such transmission (as shown at 100'' and 101'' of curve h) due to the fact that both were transmitted concurrently from points equidistant from unit 11. It will be noted, however, that by the time these two reradiated wave trains reach unit 11, the coupled section 58 associated with unit 11 has been tuned, whereby unit 11 will be non-responsive to such reradiation. Due to the fact that all the coupled sections 58 are tuned for a period of the order of fifteen microseconds, both reradiator units 12 and 13 are similarly non-responsive to the wave train transmitted from unit 11, as indicated by square waves 102'' on curves f and g occurring prior to the instant at which coupled section 58 is detuned. Thus, under these "on course" conditions, no one reradiator unit is effective to operate any other, and all the reradiator units are operative independently and exclusively of each other.

Referring to curves i, j, and k, the condition of an airplane approaching from the left, normal to the line joining units 11 and 13, and equidistant from these units, will be considered. Under these conditions, reradiator unit 12, being the nearest unit to the aircraft, will be first to respond to a particular wave train transmitted therefrom. This fact is indicated by square wave 105 on curve i. Inasmuch as both reradiator units 11 and 13 are equidistant from the aircraft, they will be simultaneously responsive to a wave train transmitted from the aircraft, as indicated by concurrent square waves 106, and 107 on curves j and k respectively. As before, in the case of curves f, g and h, all the coupled sections 58 are tuned approximately a half microsecond after termination of a received wave train, and substantially another half microsecond thereafter each reradiator unit transmits a fresh wave train, as indicated by square waves 105', 106' and 107', respectively. Again the coupled sections 58 are maintained in a tuned condition for substantially fifteen microseconds, and it will be noted that this period provides ample time to render each one of reradiator units non-responsive to energy transmitted from any other, as will be clear, from a study of the respective times that these reradiated wave trains pass the respective reradiator units (see waves 105'', 106'', 107'').

Curves l, m and n illustrate the case of an airplane 180° off course, that is, equidistant from reradiators 12 and 13 but relatively remote therefrom as compared to unit 11. In this case, therefore, reradiator unit 11 is first responsive to a particular wave train, as indicated by square wave 111; and units 12 and 13 are simultaneously responsive to the same wave train approximately 2.7 microseconds later, as indicated by square waves 112 and 113 respectively. It will be clear that this sequence of operation of the reradiator units is the inverse of that shown in curves f, g and h and that therefore, the coupled sections 58 associated with each one of these units are always operative to render any one of them non-responsive to wave trains reradiated from the other units (note waves 111'', 112'' and 113'' all occurring before coupled sections 58 are returned to their detuned states).

It will be recalled that indications 48, 49 and 50 in the configuration shown in Fig. 5 are representative of the desired pattern which should be followed by the pilot when landing on instruments by flying in the plane defined by reflecting antenna elements 11, 12 and 13 of Fig. 1. Even under the best conditions these will not be the only indications obtained on the screen of the indicator tube. For example, there may always be a certain amount of ground reflection. However, this ground reflection need not cause any confusion with respect to the desired landing configuration inasmuch as the ground will always be the reflecting object nearest the aircraft when a landing is to be effected. Thus the ground may show up as an indication such as 68 in Fig. 5 (well displaced on the "distance" scale with respect to the glide-path indications). This ground reflection indication provides an additional source of useful information to the pilot inasmuch as he will always have an indication of the absolute altitude of the aircraft and can readily imagine his location with respect to the desired landing area at all times.

A few other possible indicator tube configurations will now be considered to give an idea of how to practice an instrument landing method in accordance with the invention and also to show that there is no chance of mistaking the correct glide path. In approaching a landing field equipped with reradiators such as 11, 12 and 13, the pilot, knowing the distance from reradiators 12 and 13 to reradiator 11, will immediately be able to recognize on the screen of tube 31 the configuration indicative of these reradiators, since on the distance scale, indication 50 would be displaced from indications 48 and 49 a distance corresponding to the distance between reradiator elements 12 and 11 or 13 and 11 in the direction of flight. If the symmetric directivity axis of antenna 20' is aimed at reradiator 11 and the pilot is flying below the glide plane defined by reradiator elements 11, 12 and 13, this fact may be at once evidenced by a configuration such as shown in Fig. 6 wherein the V pattern 69 indicates that reradiating elements 12 and 13 are above his plane of flight. As before in the illustration of Fig. 5, the spot 70 indicates the relative position of reradiator 11. Both indications 69 and 70 taken together would thus convey the information that the pilot is descending on too gradual a glide plane, that is, below the proper glide plane, although he is headed directly for the landing area.

Another indication that may be obtained is shown in Fig. 7. In accordance with this figure reflections from reradiators 12 and 13 form an inverted V 71 on the screen of the indicator tube. This indication taken in conjunction with the spot 72 would indicate that the symmetric directivity axis of antennae 20' is directed at reradiator 11 but that this axis is above, rather than in, the desired glide plane. If this axis coincides with the axis of flight, it is clear that under the circumstances, the pilot is heading directly for the landing area and is descending on too steep a glide path. By appropriately maneuvering his plane between the two indications shown in Figs. 6 and 7, the configuration of Fig. 5 will be obtained as a mean and the correct descent thus established. As above indicated, when the pilot passes the edge of the field and hence passes reradiator elements 12 and 13, the reflections due to these elements will disappear from the screen of the indicating tube, and a sole indication 73 as shown on the screen of Fig. 8 may be obtained. This disappearance of reflections from reradiators 12 and 13, as above indicated, will put the pilot on guard that the time is safely appropriate for landing.

It should be noted at this point that, if by any chance there are other aircraft at the airport, perhaps in the desired landing area, this fact will be made apparent on the screen of the indicator tube; and the pilot will be able to take account of their presence by so maneuvering his craft that reflections due to these other aircraft do not form spots but rather dagger shaped indications on the screen of his indicator tube—thereby assuring himself that he is not headed directly at these other aircraft. In any case, if amplifying means is provided in the reradiator systems, as shown in Fig. 3, a relatively strong indication of the proper glide path will always be given on the screen of the tube, and the presence of other aircraft in the way may be noted by indications which are relatively weak in comparison with the strong glide-path indications.

A further typical indication that may be obtained with the apparatus described is shown in Fig. 9. This indication, it will be observed, is very similar to that shown in Fig. 6. However, it could not be confused therewith inasmuch as the spot 76 indicates reflecting antenna unit 11 to be closer to the aircraft than units 12 and 13 (see indications 74 and 75, respectively). Thus, the pilot would know that he was approaching the field from the wrong direction and that he must make a half circle about the field. As he begins to bank, units 11, 12 and 13 may appear on his screen in the configuration shown in Fig. 10, wherein indication 78', being weaker than indication 78 and also displaced further along the distance scale, indicates reradiator 12 to be nearer the aircraft and the axis of antennae 20' to be to the left of the true glide path. Inasmuch as both these indications 78 and 78' appear horizontal, it would seem that the pilot is in a gentle bank wherein the plane of his wings lies in the plane of the desired glide path, but he is not yet headed in a correct direction for landing, although the axis of antennae 20' is directed at reradiator 11.

In accordance with another preferred embodiment of my invention, a correct and safe glide path is established with reradiators 12 and 13 disposed on the ground in the same manner as reradiator 11. Assuming this condition, the correct glide path would be recognized by a pilot if he so orients the axis of antennae 20' that it is directed to produce an indication such as shown in Fig. 11 on the screen of his tube 31. This indication comprises an inverted V 79 and a spot 80. The inverted V indicates reradiators 12 and 13 to be symmetrically disposed about the line of flight and to be below the plane of flight—the correct condition precedent to this alternate method of landing. In employing this type of system, it is preferred that lines 81 and 81' be ruled or otherwise superimposed on the screen of the indicator tube to indicate the appropriate angularity of inverted V 79 for the proper glide angle, as will be clear.

It is to be noted that the detecting apparatus described in connection with Fig. 2 has the inherent disadvantage of being unable to discriminate between two reflecting objects having the same reflecting characteristics and spaced equally from the plane symmetrically about its axis of flight. Under such conditions, it is clear that a cancellation of direction indicative deflection potentials may cause a mere spot to appear on the screen of indicating tube 31, whereas in truth there are two reflecting objects. In descending by means of the above-described glide-path, this inability to discriminate between two equidistant objects symmetrical about the axis of flight may be a cause for considerable confusion to the pilot of the aircraft as he is trying to land. In such case, this confusion may be entirely obviated by providing suitable keying means 98 (see Fig. 1) for alternately rendering units 12 and 13 effective to reradiate received wave trains. If this alternation is performed at a rate greater than the persistence of vision on the screen of the indicating apparatus on the aircraft, it is clear that both reradiators 12 and 13 will appear to be simultaneously effective. Keying means suitable for this purpose is connected to control the bias on amplifier 56 for units 12 and 13 in the same manner as that above described in connection with keyer 66.

Any possibility of confusing signals reradiated from units 12 and 13 may also be avoided in accordance with a further embodiment of the invention by controlling the delay network 57 in one of these reradiator units effectively to impose a delay in the wave trains detected thereby greater than the delay imposed by the corresponding network 57 of the other reradiator unit. In such case, the aircraft will obtain a set of indications such as shown in Fig. 12 for a condition of proper glide path flight. As in the illustrations above-described in connection with Figs. 5 through 10, the pilot would still strive to maintain indications for reflections from unit 11 as a spot 67 and to keep the other indications 68, 68' indicative respectively of reflections of units 12 and 13, in a horizontal although not aligned disposition. In this latter case, the pilot must depend solely upon equality of deflection for indications 68 and 68' to keep himself upon the course, whereas in the above-described examples of Figs. 5 through 10, any noticeable offsetting of one of the indications 48 with respect to the other 49, along the distance scale, is a further indication of a deviation from the correct course (see also Fig. 10).

There are several reasons for including in the reradiator unit of Fig. 3 means for effectively delaying detected wave trains. First, by delaying the received impulse prior to re-transmission, it is possible to re-transmit at a relatively high level compared to the received signal strength, without any danger of occurrence of "singing." Furthermore, because of the delay, aircraft landing by means of the reradiated signals may fly as close as the immediate vicinity of the reradiator without there being any danger of the blanking impulse generated by network 18' in the aircraft receiver cutting out wave trains reradiated from a particular reradiator unit, as will be clear.

For a better understanding of the operation of the invention, the above discussion has considered the antenna unit 20' on the aircraft as fixed and having its directional axis of symmetry coincidental with the axis of flight of the aircraft. In an alternate preferred operation in accordance with the invention, however, and at very short wavelengths, all the antennae 20' are mounted as a unit having the above-defined directional characteristics with respect to the axis of disposition of the unit. The unit is orientable and to this end preferably mounted on a ball and socket swivel joint or the equivalent, whereby it may be manually aimed by the pilot at reradiator unit 11. In this manner, the indication corresponding to the unit 11 is always maintained as a spot, in order better to identify the landing field and better to be able to picture landing conditions. Once the pilot has in this way so maneuvered his craft that its axis of flight is directed at reradiator 11 and is in the correct glide path, the swivel mounting for antenna 20' should be locked in position so that the pilot will have one less operation to think about.

In a further embodiment, analogous to that described above in connection with Fig. 11, an aircraft may be guided to land toward the near end of the field, whereby a longer and safer taxiing distance is permitted before braking and stopping. In this latter embodiment, all reradiator units 11, 12 and 13 are disposed on the ground, unit 11 preferably being in a pit covered with a non-shielding material and located in the middle of the landing area so that the same pit may be used no matter what the direction of wind, and hence direction of landing. As shown in Fig. 13, the screen of the pilot's indicator tube 31 is ruled or has otherwise superimposed thereon a system of guide lines 87, 87', 87" and 87'" indicating certain slopes for indications 86 and 86' at different distances of approach therefrom (corresponding to reflections from reradiators 12 and 13). For different distances from the landing area, the pilot still aims his aircraft at the reradiator unit 11 in the middle of the field; but it will be noted that as he approaches the field, the slope of indications 86 and 86' must be flattened in accordance with the guide lines 87', 87" and finally 87'" to bring him down properly to the near edge of the landing area, as will be clear. A particular advantage of this latter arrangement is seen in the fact that the three indications 85, 86 and 86' will always be obtained and clearly visible to the pilot up to the time his wheels touch the ground, whereas in the other above-described forms, as illustrated in Fig. 8, indications on the cathode ray screen corresponding to reradiation from units 12 and 13 disappear before the wheels touch the ground.

Where economy and extreme portability are prime considerations, a much simplified form of reradiator unit may be employed, that is, much simpler than the form shown in Fig. 3. This simplified reradiator is shown in Fig. 3a and comprises a single antenna 90 connected directly to one corner of a conjugate network, designated generally as 91. Input and output connections of a carrier-frequency amplifier 92, responsive to the carrier frequency of wave trains transmitted from the aircraft, are connected respectively to conjugate corners of network 91. The remaining corner of conjugate network 91 includes a balancing network 93 so that there will be no interchange of energy between input and output circuits of amplifier 92 due to their connection to network 91, as will be clear. Suitable delay as instituted by network 94 in the output of amplifier 92 makes it possible for pilots always to see indications corresponding to reradiated wave trains from this apparatus no matter how close they approach it, as explained above in connection with Fig. 3. In order to prevent one such reradiation unit from picking up and relaying wave-trains already reradiated from other units a square-wave generator 95 supplies control signals of suitable duration to keep a coupled section 96 (in the amplifier-input circuit) tuned during reradiation and for a sufficient length of time to block out reception of energy reradiated from the reradiator units. This type reradiator unit has the inherent disadvantage of dissipating energy in network 93 and is therefore undesirable for high power. However, when there are few reflecting bodies in the neighborhood of the landing area, as when a seaplane is landing on a water surface, wave trains reradiated from a low power unit such as the arrangement of Fig. 3a will be clearly identifiable, and a landing may be effected with relative safety, inasmuch as there is no need to worry about over-running the landing area.

In certain cases, in connection with instrument landing on water surfaces, where there are substantially no radiant energy reflecting bodies except the water, it is preferable to use passive reflectors as the reradiator units, inasmuch as such reflectors may be mounted on buoys and would require little or no attention or upkeep other than to be towed into the appropriate positions depending upon the direction of wind. The arrangement illustrated in Fig. 1 may be considered as an illustration of this system. The landing area then constitutes a water surface.

The systems described provide relatively simple methods for enabling aircraft to be landed under conditions of poor visibility; and, as far as the aircraft equipment is concerned, no substantial additional apparatus need be provided to follow out the method, provided the aircraft is equipped with obstacle detection or radio-location equipment of substantially the above-indicated nature. It will be clear that in addition to uses of this single piece of apparatus on the aircraft for both instrument landing and locating aircraft, it may be employed to give a clear indication of absolute altitude and also in certain radio course navigation cases. In the latter instances reradiator units of the nature indicated for instrument landing applications may be used that is, single reradiators, such as shown in Fig. 3 or 3a, and suitably spaced along a desired course, will give pilots a steady course if they strive to maintain indications corresponding to reradiation therefrom as single spots, as will be clear. For instrument landing purposes, the only apparatus that need be installed in the vicinity of the landing area may be so compact and simple, as to be readily portable on light trucks, or even passenger automobiles or trailers. The apparatus installed in the vicinity of the desired landing area is furthermore so simple as to require relatively little expert care or supervision. The landing area installation is so readily portable that a new field or a new course may be defined in an above-indicated manner in the space of relatively few minutes.

By making receivers associated with the reradiators 11, 12 and 13 highly discriminatory as to the carrier frequency to which they are to respond, namely, the carrier frequency for transmitting wave trains from the aircraft, secrecy of the apparatus may be still further enhanced. It is to be noted that in order for any enemy aircraft to try to locate such a landing area defined in the above-indicated manner, the enemy must under the circumstances know precisely the carrier frequency to which the reradiator elements will respond. Even so, he will give his presence away by transmitting a number of wave trains himself in an effort to find the airport. Further secrecy can be assured by prescribing various different delays within the circuits of reradiators 11, 12 and 13. The pilot of friendly aircraft will be cognizant of these delays and recognize them in interpreting his image upon the cathode ray screen; and, clearly the chances of an enemy pilot knowing of these delays, or, in that event, how to take account of them, are relatively slight. If any enemy were to try to land by assuming wrong delays in connection with reradiators 11, 12 and 13, he would land either ahead of or beyond the desired landing area at too great a speed and hence would very likely crash.

Conceivably, it may not be possible to keep the character of the reflector units secret from enemy spy agents, and it might therefore be possible for them to set up apparatus similar to reradiators 11, 12 and 13 in the neighborhood of the landing area so as to give false glide-path indications and thus to jam the pattern of signals reradiated by elements 11, 12 and 13. This undesirable feature can be met, however, by relatively simple precautions. For example, keying means 66 may be provided in connection with each one of the reradiator elements so as alternately to render each of these units effective and ineffective to reradiate received wave trains. The frequency of this alternation would preferably be at some visibly recognizable rate whereby the pilot of a friendly aircraft could recognize his airport from a blinking on-and-off of the three indications representative of units 11, 12 and 13 in accordance with a known keying signal.

As above indicated, it is preferable that impulse generator 18 carried on the aircraft be allowed to run free and thus to generate intermittent impulses (that is, non-periodically recurrent). Now, if several aircraft are simultaneously approaching the desired landing area, each, if equipped with such an impulse generator, will be transmitting unsynchronized wave trains having no regular recurrent pattern and hence relatively few instants of concurrence. Each airplane's saw-tooth generator is also, as above noted, synchronized with its impulse generator 18 so as to produce a fresh saw-tooth for each impulse generated. Thus, each airplane will show on its indicator tube 31 steady indications corresponding only to reflections or reradiations from units 11, 12 and 13 for wave trains transmitted directly from the particular aircraft. Reradiation from units 11, 12 and 13 corresponding to wave trains transmitted from other aircraft, the latter wave trains being unsynchronized with that from the said particular aircraft, will, accordingly, not appear as steady indications on the screen of the indicator tube 31. Thus, with a random type impulse generator, it is possible for a number of aircraft simultaneously to converge on the landing area. Standard interplane communication means will serve to aid the respective aircraft in notifying each other when they are about to land so as to avoid collision.

It is to be noted that the invention has particular utility in defining the landing deck of an aircraft carrier, as when bombing and torpedo operations are carried out under smoke screen or night conditions. In such case reradiators 12 and 13 should be disposed at the approach end of the deck and spaced apart the width of the deck. Reradiator 11 again should be in a pit on the deck; or, in order to be more certain of staying on the deck after passing units 12 and 13, two further units spaced similar to the disposition of units 12 and 13 should be employed between unit 11 and units 12 and 13 and in the glide plane. In the latter manner, even after passing the outer markings, as defined by reradiation from units 12 and 13, the pilot will still have bearings on two side markers and the spot from unit 11 to help him keep his course. The fact that units 12 and 13 cannot be spaced much more than the width of the ship means that angular changes in indications 49, 50 will be more readily apparent for up or down deviations from the glide plane. Accordingly, a clearly defined glide path may be set up for such use. There will be no danger of colliding with units 12 or 13 on landing since the pilot should always, as indicated, maintain reradiation from these units on opposed sides of his axis of flight; and, as he approaches these units, his relative proximity to one with respect to the other will become increasingly noticeable, it thus becomes increasingly simple for him to pass between units 12 and 13, as the landing deck is approached. In this connection, it is further to be noted that, since an aircraft carrier is always headed correctly with respect to the wind whenever landing or take-off operations are proceeding, the reradiator units may be rigidly and permanently installed.

It is clear that although I have described my invention as being particularly adaptable to obstacle-detection systems of the "pulse" modulation type, it may be equally or more desirable to employ other systems. For example, the varying frequency system, wherein received reflected waves are caused to beat with those transmitted to give a distance indication, may be adapted to directional-discriminating purposes by using appropriately directive antennae, as will be clear. In such case, there would be no need to introduce the delays and blanking signals described above as being desirable in a "pulse" system, for conjugate networks may be employed to discriminate concurrent signals. It is to be noted that with this latter type system wherein no delays are necessary, the reradiator units may be substantially simplified and reradiation therefrom will never be unobservable on the aircraft, no matter how close it approaches a reradiating unit. "Singing" between the respective reradiator units may be prevented by appropriately interconnecting them by conjugate network means, whereby energy reradiated by one unit will not cause operation of another. Furthermore, ground reflection (absolute altitude) having no delay, and reradiation from units 11, 12, 13, having substantially no delay, will appear properly related on the same time or distance scale on the aircraft's indicating apparatus, thus giving a pilot a more readily interpretable reading.

While the invention has been described in particular detail in connection with the preferred forms shown, it is to be understood that many modifications, additions, omissions and adaptations may be made without departing from the spirit and scope thereof as defined in the appended claims.

What I claim is:

1. The method of landing an aircraft on a desired area in the vicinity of which a plurality of relatively widely spaced fixed radiant energy reflectors are disposed, said aircraft being equipped with radiant energy radiating and receiving apparatus for detecting the general direction of an object and indicating the same on the screen of a cathode ray oscillograph, which method comprises transmitting energy from said radiating apparatus, receiving said radiated energy after reflection from said reflectors, orienting the aircraft to such a position that images thereby formed on the oscillograph screen form a predetermined pattern, said pattern being understood as indicative of received reflections from said plurality of reflectors, and continuing flight while maintaining substantially the same pattern on the oscillograph screen.

2. An antenna system for aiding in the instrument landing of aircraft along a desired glide path which comprises a plurality of reradiating antenna units responsive to substantially a given wave-length and well displaced from each other about the area in which the aircraft is to be landed, one of said units being placed in a plane including said desired glide path, and two of said units being equally spaced apart on opposite sides of said plane, each of said antenna units being displaced with respect to the others of said plurality a large number of said wavelengths.

3. An antenna system according to claim 2 wherein said reradiating antenna units include relay means, whereby energy detected by said relay means may be reradiated at a higher signal level.

4. An antenna system according to claim 2, wherein said reradiating antenna units are generally directional in a sense longitudinal with respect to the desired glide path and opposed to the direction of flight in landing.

5. An antenna system for aiding in the instrument landing of aircraft, said system comprising a radiant energy reradiating unit distant from a desired landing location and in the desired direction of landing, and two further reradiating units in front of the desired landing location, each of said further reradiating units being disposed on one side of the desired glide path.

6. An antenna system according to claim 5, wherein said further reradiating units are elevated above the level of the landing location and said first-mentioned reradiating unit is substantially at the level of the landing location, whereby all three of said reradiating units lie in one plane at an angle to the plane of the landing location.

7. The method of orienting an aircraft in a desired glide path, which method comprises transmitting brief trains of radiant energy from the aircraft, reradiating said energy from at least two displaced points in the vicinity of a desired landing location, detecting the respective delays from transmission to reception of energy so transmitted from the aircraft and reradiated from said points, detecting the respective directions of reradiation from said points with respect to the aircraft, visually indicating on the aircraft the direction and relative distance of said points with respect to the aircraft, orienting the aircraft to such a position that a predetermined and understood visual image is thus obtained, and continuing flight while maintaining substantially the same predetermined visual image.

8. An instrument landing system comprising means on an aircraft for transmitting brief trains of radiant energy, reradiating means including at least two reradiating units in the vicinity of a desired landing area, and detector means on the aircraft for detecting the respective delays from transmission to reception of wave trains transmitted by said first-mentioned means and reradiated by said reradiating means, said detector means including means detecting the respective directions of such reradiation with respect to the aircraft, said detector means further including means visually indicating on the aircraft the direction and relative distance of said points with respect to the aircraft.

9. An instrument landing system according to claim 8, wherein said indicating means includes a cathode ray tube having a fluorescent screen, and further comprising fixed graphical markings effectively superimposed on said screen, said graphical markings being indicative of a characteristic of the cathode ray pattern that will be projected on said screen when the aircraft is on the correct glide path.

10. An antenna system according to claim 5, wherein all said reradiating units are disposed at substantially the level of the desired landing area.

11. An antenna system for aiding in the instrument landing along a desired glide path of aircraft equipped with apparatus for transmitting on a carrier brief wave trains of said carrier, said system comprising a plurality of passive-network reflecting antenna units tuned to substantially the frequency of said carrier and displaced from each other about the area in which the aircraft is to be landed, one of said units being placed in a plane including said desired glide path, and two of said units being equally spaced apart on opposite sides of said plane, each of said antenna units being displaced a large number of wave lengths at said carrier with respect to others of said plurality.

12. A system for aiding in the blind landing of aircraft on a water surface along a desired glide path, said aircraft being equipped with obstacle detection apparatus operating at a given wavelength, comprising a plurality of buoys displaced from each other about the area in which the aircraft is to be landed, one of said buoys being placed in a plane including said desired glide path and two of said buoys being placed on opposite sides of said plane, reradiating means mounted on each of said buoys, each of said buoys being displaced with respect to the others of said plurality a large number of said wavelengths.

13. An antenna system according to claim 2, further comprising keying means coupled to one of said reradiating antenna units for rendering said one antenna unit effective to reradiate energy at one level alternately with another level, said keying means being operative at a visually resolvable frequency.

ROY C. HOPGOOD, Jr.

REFERENCES CITED

The following references are of record in the file of this patent:

UNITED STATES PATENTS

| Number | Name | Date |
|---|---|---|
| 2,226,860 | Greig | Dec. 31, 1940 |
| 2,134,716 | Gunn | Nov. 1, 1938 |
| 2,280,126 | Metcalf | Apr. 21, 1942 |
| 2,212,110 | Beuermann | Aug. 20, 1940 |
| 2,231,929 | Lyman | Feb. 18, 1941 |
| 2,151,549 | Becker | Mar. 21, 1939 |

FOREIGN PATENTS

| Number | Country | Date |
|---|---|---|
| 557,257 | Germany | Aug. 20, 1932 |